No. 662,920. Patented Dec. 4, 1900.
R. M. DIXON.
GAS MAKING APPARATUS.
(Application filed Oct. 5, 1899.)
(No Model.) 2 Sheets—Sheet I.
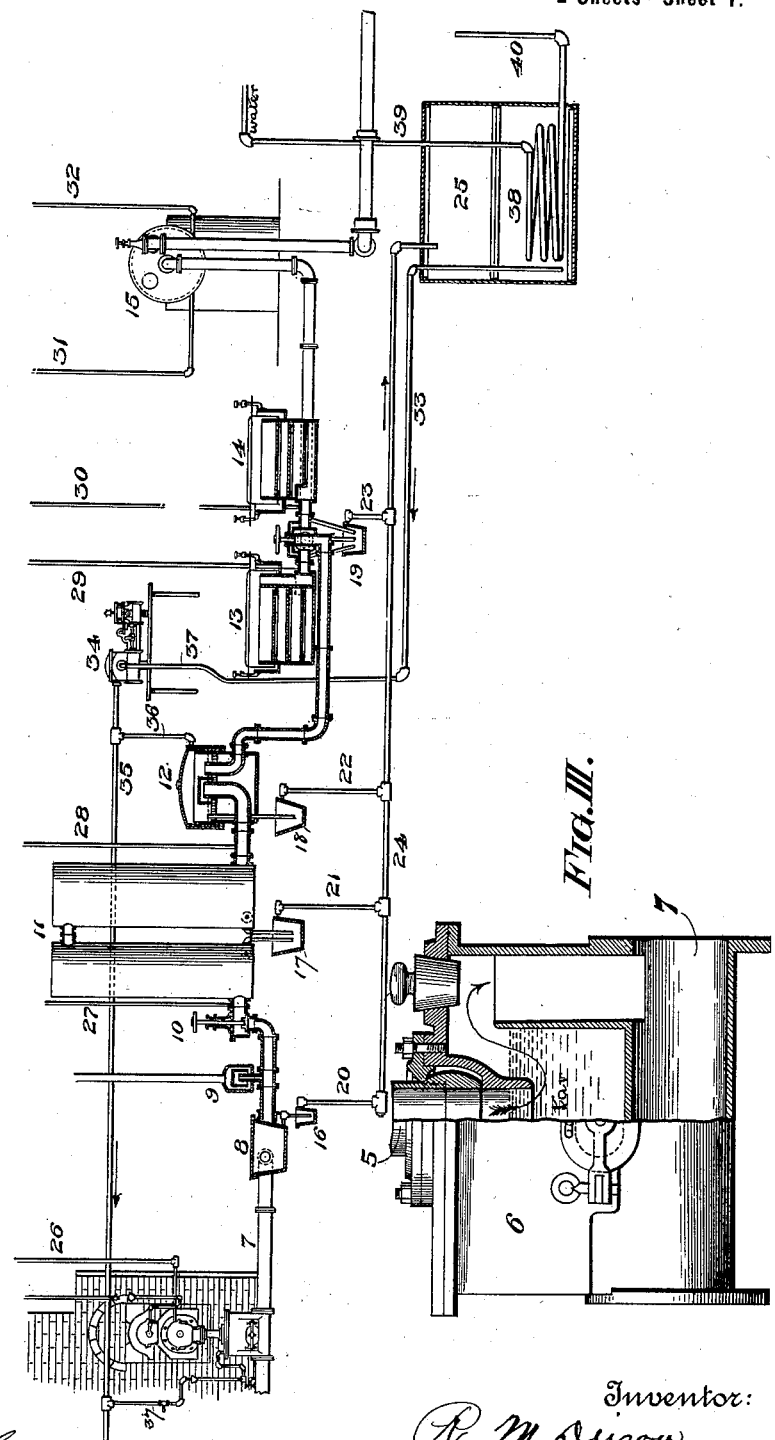
Witnesses
Inventor:
R. M. Dixon,
By Joseph D. Atkins
Attorney

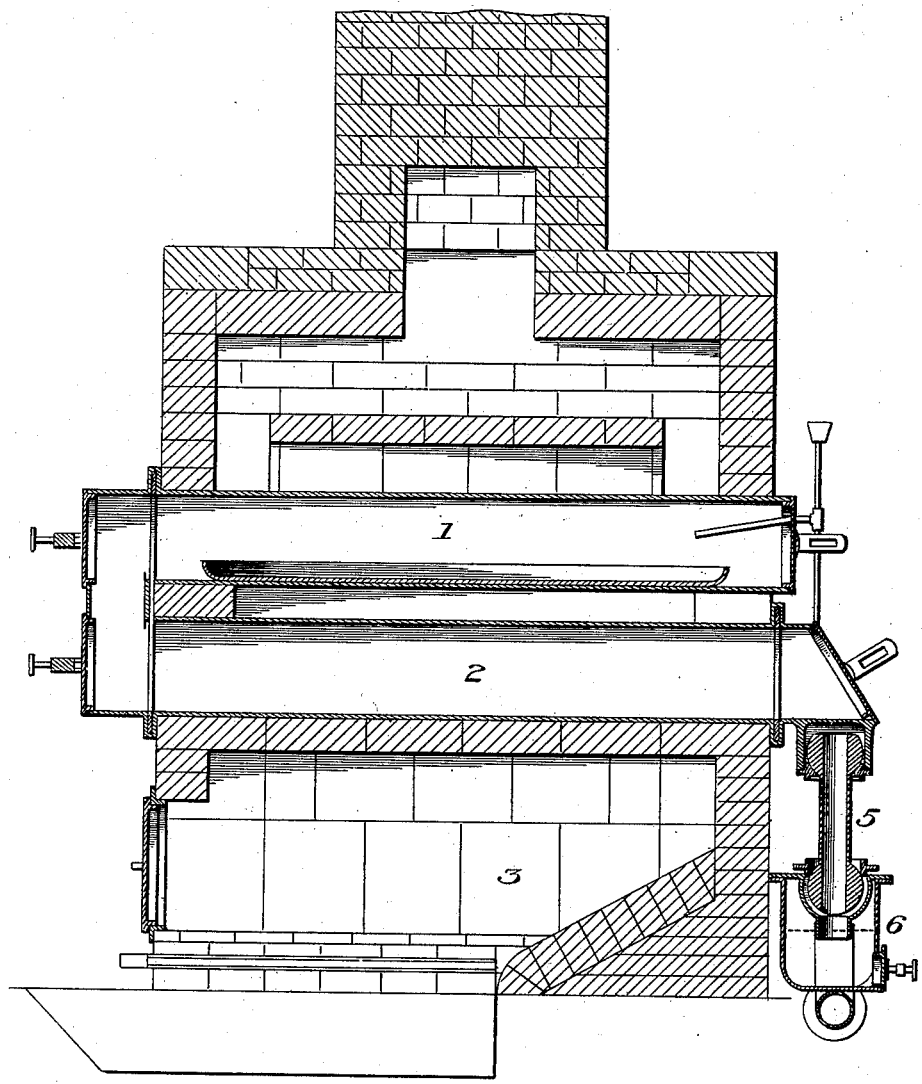

UNITED STATES PATENT OFFICE.

ROBERT MUNN DIXON, OF EAST ORANGE, NEW JERSEY.

GAS-MAKING APPARATUS.

SPECIFICATION forming part of Letters Patent No. 662,920, dated December 4, 1900.

Application filed October 5, 1899. Serial No. 732,617. (No model.)

*To all whom it may concern:*

Be it known that I, ROBERT MUNN DIXON, of East Orange, in the county of Essex, State of New Jersey, have invented certain new and useful Improvements in Gas-Making Apparatus, of which the following is a complete specification, reference being had to the accompanying drawings.

The object of my invention is to produce improvements in apparatus for the manufacture of gas whereby the necessity of passing the gas through water is obviated. By the method of manufacture in general use the gas from the retort, loaded with vapors of tar and other impurities, is repeatedly passed through water, by which the gas is cleansed of the tar and other impurities. The mixture of the water with the tar from the oil is destructive to the value of the tar, because it is practically impossible to separate the tar from the water, and the presence of water in the tar destroys the value of the latter for fuel or for any chemical purpose.

In the accompanying drawings, Figure I is a diagrammatical view exemplifying a practical form of apparatus for the manufacture of gas. Fig. II is a sectional view of a set of retorts and furnace, illustrating the liquid seal through which the gas from the lower retort is delivered to the main pipe that leads to the holder. Fig. III is a front elevation, half in section, of the liquid seal shown in Fig. II, detached.

Referring to the numerals on the drawings, 1 indicates the upper retort, 2 the lower retort, and 3 the fire-pot, of one of a plurality of furnaces with which a plant is usually provided. The furnace is shown as provided with a pipe which, communicating at one end with a source of oil-supply, (not illustrated,) furnishes oil to the upper retort 1. The gas generated in the upper retort 1 is passed through the lower and hotter retort 2, where it is fixed and whence it issues, as through a pipe 5 and liquid seal 6, to the main pipe 7, which in its course is provided with a tar-box 8, a safety-valve 9, a shut-off valve 10, a condenser 11, a washer 12, and finally purifiers 13 and 14. Leaving the purifiers the main pipe 7 passes through a meter 15 and thence to a gas-holder. (Not illustrated.) A tar-pot 16, communicating with the tar-box 8, receives therefrom the first deposit of tar. A tar-pot 17 also communicates with the condenser 11, a tar-pot 18 drains the washer 12, and a tar-pot 19 drains the purifiers 13 and 14 and those portions of the main pipe connected therewith. All of the tar-pots, as through respective branch pipes 20, 21, 22, and 23, discharge, as through a common discharge-pipe 24, into a tar-well 25.

26, 27, 28, 29, 30, 31, and 32 indicate pipes which lead from the various parts of the apparatus to a differential gage, not necessary in this connection to illustrate.

Ordinarily the liquid seal 6 and the washer 12 are filled to required extent with water through which the gas is compelled to pass and in passing through which it is cleansed of impurities. It is to dispense with the use of water for performing this function that my invention is made. To accomplish that end I substitute for the water ordinarily employed tar.

Usually the member 6 is termed the "water seal" and the member 12 the "washer;" but since the gas is compelled in its passage through each member to pass through a volume of liquid I prefer to class both members 6 and 12 under the general term "water-sealing devices," in order to conveniently and generically designate them in the claims appended.

The tar is preferably obtained through a suction-pipe 33, communicating at one end with the tar-well, which constitutes a continuously-replenished source of supply, and at its other end with a pump 34, which supplies the tar from the suction-pipe 33 to a common delivery-pipe 35. The delivery-pipe communicates at required intervals, as through valve-controlled branch pipes 36 and 37, with those parts of the apparatus which require the presence of the liquid which the pipe 35 is designed to supply. The pipe 36, for example, is adapted to supply tar, as required, to the interior of the washer 12 and the pipe 37 to the interior of the seal. The amount of liquid supplied through the several branch pipes may be regulated, as by the valves in those pipes or otherwise, as preferred.

Since the contents of the tar-well 25 is liable to become at times overheated and since it is necessary that it should be utilized for the purposes hereinbefore specified in a comparatively cool state, means should be provided for cooling it before it is supplied to the suction-pipe 33. For this purpose I prefer to provide in the bottom of the well 25 a cooling-coil 38, which, communicating as through a pipe 39 with the water of the gas-holder (not illustrated) at a high level, communicates through its terminal 40 with the water of the gas-holder at a lower level. By this means circulation by gravity through the coil 38 may be effected. Of course the coil may be supplied with water directly from a main or other source of supply or other means of cooling the well 25 may be employed, if preferred.

The operation of the apparatus being briefly but comprehensively outlined in the foregoing description addressed to one skilled in the art, it is thought to afford a sufficient explanation of the operation of this apparatus without more detailed specification in that regard.

What I claim is—

1. In an apparatus for the manufacture of gas, the combination with the liquid-sealing portions thereof, of a receptacle for the tar generated by the apparatus, and means for producing circulation of the tar from said receptacle to the sealing portions of the apparatus, and back to the tar-receptacle, substantially as set forth.

2. In apparatus for the manufacture of gas, provided with liquid-sealing portions, the combination with its tar-well, adapted to receive tar generated by the apparatus, of a suction-pipe, pump and tar-delivery pipe, operatively connected with the sealing portions, and a cooling-coil adapted to reduce the temperature of the tar so as to render it available for use in the sealing portions, while the apparatus is in operation, substantially as set forth.

In testimony of all which I have hereunto subscribed my name.

ROBERT MUNN DIXON.

Witnesses:
A. C. MOORE,
MARTIN J. MORGAN.